United States Patent [19]
Tsuda

[11] Patent Number: 4,742,554
[45] Date of Patent: May 3, 1988

[54] IMAGE DATA PROCESSOR

[75] Inventor: Shin Tsuda, Yokohama, Japan

[73] Assignee: Canon Kabushiki Kaisha, Tokyo, Japan

[21] Appl. No.: 931,929

[22] Filed: Nov. 17, 1986

Related U.S. Application Data

[63] Continuation of Ser. No. 615,175, May 30, 1984, abandoned.

[30] Foreign Application Priority Data

Jun. 7, 1983 [JP] Japan .................... 58-100179

[51] Int. Cl.[4] ........................................... G06K 9/00
[52] U.S. Cl. ........................................ 382/50; 358/260; 382/56
[58] Field of Search ............ 382/50, 51, 52, 53, 382/56; 358/260, 282; 340/347 AD

[56] References Cited

U.S. PATENT DOCUMENTS

| | | | |
|---|---|---|---|
| 4,196,453 | 4/1980 | Warren | 382/52 |
| 4,409,623 | 10/1983 | Kobayashi et al. | 358/260 |
| 4,447,829 | 5/1984 | Schayes et al. | 358/260 |
| 4,547,811 | 10/1985 | Ochi et al. | 382/53 |
| 4,554,594 | 11/1985 | Ciardiello et al. | 358/282 |
| 4,578,715 | 3/1986 | Yamaguchi | 382/53 |

Primary Examiner—Leo H. Boudreau
Attorney, Agent, or Firm—Fitzpatrick, Cella, Harper & Scinto

[57] ABSTRACT

The present invention is intended to binary process an image signal obtained by scanning image data by a plurality of threshold levels and to two-dimensionally encode a plurality of binary outputs derived in this way, thereby to telegraph-transmit an image at intermediate gradient. Then, by adopting the encoding by the Modified Read method which has a K parameter value coresponding to the number of such threshold levels, the intermediate gradient image can be telegraph-transmitted efficiently at a high speed. Furthermore, by merely increasing the threshold levels, the image at a variety of intermediate gradients of four, eight or sixteen values, or the like can be telegraph-transmitted and recorded, so that a degree of freedom is designing the apparatus is raised.

13 Claims, 5 Drawing Sheets

IMAGE DATA PROCESSOR

This application is a continuation of application Ser. No. 615,175 filed May 30, 1984, now abandoned.

BACKGROUND OF THE INVENTION

1. Field of the Invention

The present invention relates to an image data processor which processes image data so that a picture image including image data at intermediate gradient can be telegraph-transmitted at a high speed.

2. Description of the Prior Art

Conventionally, as a method of telegraph-transmitting an image at intermediate gradient in facsimile apparatuses, a method of encoding the intermediate gradient for every pixel, an intermediate gradient telegraph-transmitting method using a dither method, and the like are known.

The former method of encoding the intermediate gradient for every pixel has drawbacks such as that it is not compatible with the telegraph-transmitting method for a binary signal which is generally used and that it takes a longer time for telegraph-transmission as the number of slice levels of the intermediate gradient is increased.

On the other hand, the latter telegraph-transmission by the dither method has drawbacks such as that resolution is equally bad and the quality of an image received is also bad, and that if an encoding method such as MH (Modified Huffman) or MR (Modified Read) or the like specified in the recommendation T4 by the CCITT (International Telegraph and Telephone Consultative Committee) which was determined on the basis of the statistical nature of a picture image is used as it is, the efficiency in transmission is extremely bad and high speed telegraph-transmission is difficult.

SUMMARY OF THE INVENTION

It is a first object of the present invention to enable the intermediate gradient in image data to be telegraph-transmitted with high fidelity.

It is a second object of the invention to enable such an image at intermediate gradient to be telegraph-transmitted at a high speed.

A third object of the invention is to raise a degree of freedom in designing the apparatus with regard to the setting of a variety of intermediate gradients.

These objects are obtained according to the invention by providing an image data processor comprising photoelectrinc converting means for converting original image data to an image signal, means for comparing that signal with a plurality of different threshold levels to obtain a plurality of binary time series signals for each of the threshold levels, means for encoding each of the binary time series signals and means for transmitting the encoded signals.

In another aspect, the objects of the invention are attained by providing an image data processor comprising photoelectric means for converting original image data to an electrical image signal, means for converting that signal to a signal of multi-values comprising a plurality of bits, means for run-length encoding a respective time series signal for each of the bits, and means for sequentially transmitting the time series signals.

DETAILED DESCRIPTION OF THE PREFERRED EMBODIMENTS

Figure 1:
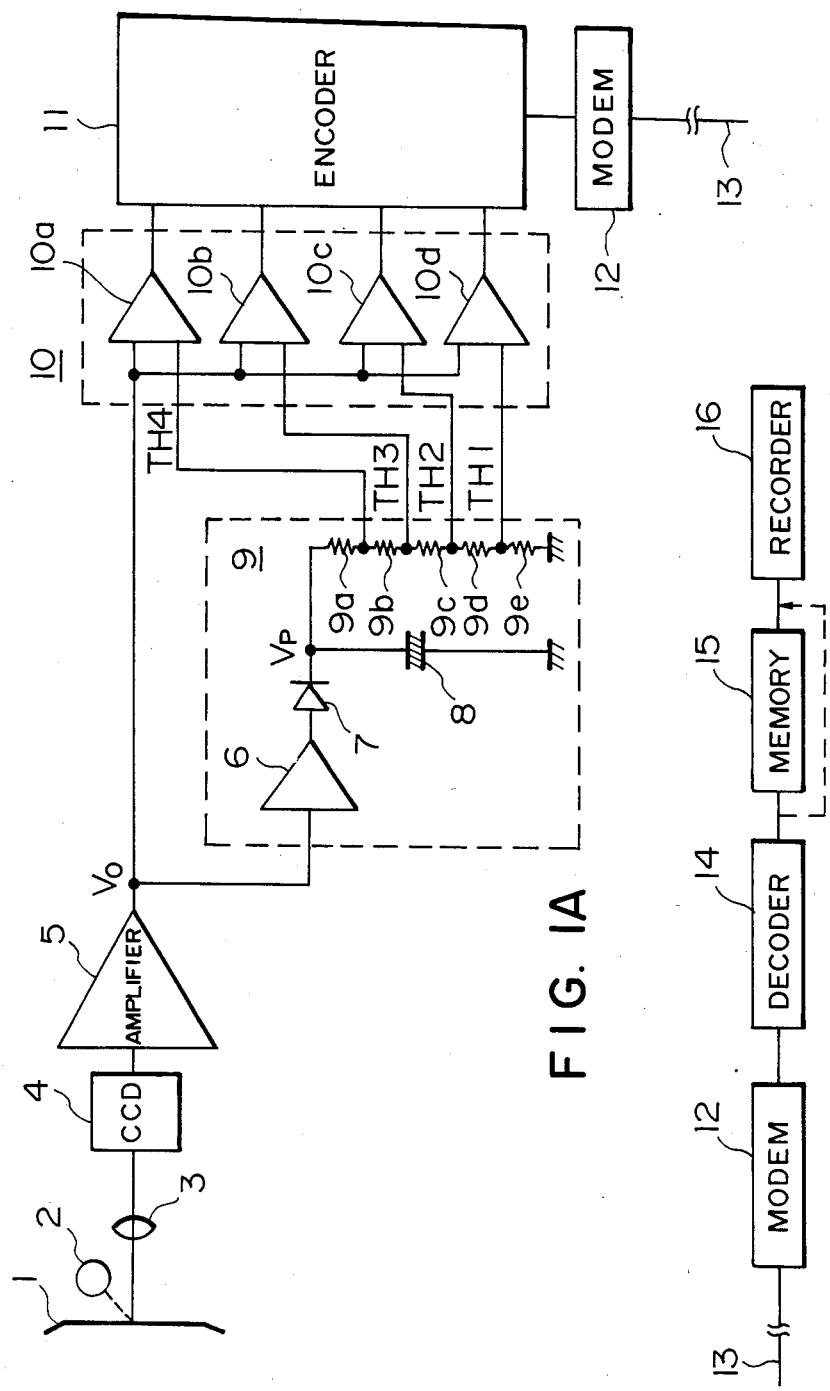
FIGS. 1A and 1B are block diagrams to describe a constitution of a facsimile apparatus of the present invention.

The present invention will now be described in detail hereinbelow with respect to an embodiment shown in the drawings.

FIG. 1A shows a block diagram on the image transmission side of a facsimile apparatus according to the present invention. In the diagram, a reference numeral 1 denotes an original whose image will be read. The image on the original 1 is illuminated by a light source for illumination 2 such as a fluoroscent lamp, LED, or the like and is input to a CCD sensor 4 through a lens 3. The CCD sensor 4 transduces the optical image data to the electrical signal and this image signal is sent to an amplifier 5 and is amplified. An output voltage $V_0$ of the amplifier 5 is transmitted to both an amplifier 6 and an input of a comparator 10.

An output terminal of the amplifier 6 is connected through a diode 7 to charge a capacitor 8. A voltage across the capacitor 8 is divided by a resistance 9 consisting of resistors 9a to 9e. Respective divided voltages TH4 to TH1 through each of these resistors are led to remaining input terminals of the comparator 10 as threshold voltages.

The above-mentioned amplifier 6, diode 7, capacitors 8 and resistors 9 constitute a peak value detecting circuit. Namely, the charges are accumulated in the capacitor 8 through the diode 7 in response to an output of the amplifier 6 corresponding to the output of the CCD sensor 4, and the highest voltage level of that output, i.e., a peak voltage $V_p$, is held in the capacitor 8 and is gradually discharged through the resistance 9. The values of the respective resistors 9a to 9e and a voltage dividing ratio are determined in dependence upon the number of levels of the intermediate gradient which one desires to obtain and upon the recording characteristic of the recorder used, etc. With such a constitution, since each threshold value is determined in accordance with an intensity peak value in the original, it is possible to derive an appropriate intermediate gradient in response to the intensity of the original which is being scanned.

The comparator 10 comprises four comparators 10a to 10d consisting of operational amplifiers or the like and binary-processes the output voltage $V_0$ of the amplifier 5 corresponding to the output of the CCD sensor 4 by the threshold voltages, respectively. Therefore, in this embodiment, the image can be represented based on the intermediate gradient levels of four values.

Outputs of the comparators 10a to 10d are connected to an encoder 11 and they are encoded by this encoder. The encoded image signal is modulated by a modem 12 to the analog signal which can be transmitted on the line, and thereafter it is output to a line 13.

FIG. 1B is a block diagram showing the apparatus on the image reception side of the facsimile apparatus which is used in the present invention. The data transmitted through the line 13 is demodulated by the similar modem 12 as mentioned before. Then, signals MH, MR, MR, and MR of four values which will be described later are all decoded by a decoder 14, and thereafter they are temporarily stored in a memory 15. The signals which have been once stored are output to a recorder 16 without interruption. Or, they are output from the decoder 14 to the recorder 16 without passing through the memory 15 and the image is recorded by the recorder 16 such as a thermal printer or the like in accordance with its result.

Figure 2:
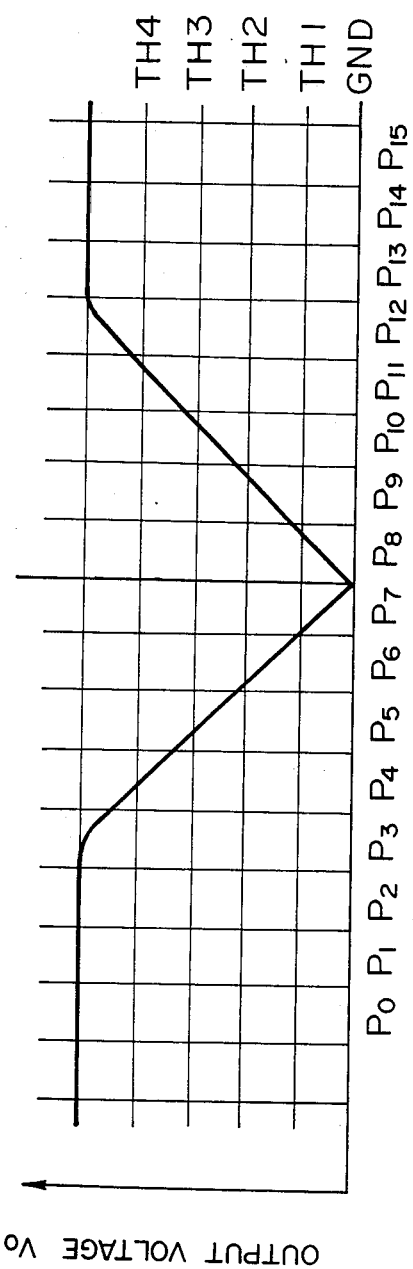
FIG. 2 is a diagram showing an output voltage of an amplifier in FIG. 1A.

In such a constitution, it is now assumed that the voltage $V_0$ as shown in FIG. 2 was derived at the output of the amplifier 5 connected to the CCD sensor 4 as a result of the original 1 having been scanned by the CCD sensor 4. Reference characters $P_0$ to $P_{15}$ represent the pixel positions scanned on the original 1, and the threshold levels are indicated by reference characters TH1 to TH4.

Figure 3:
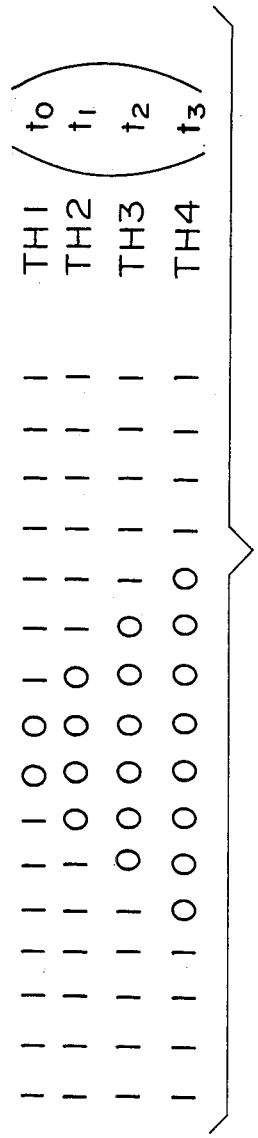
FIG. 3 is an explanatory diagram showing the binary processing result of the output voltage of FIG. 2.

The result of the binary processing by the comparator based on the above threshold levels is shown in FIG. 3. Each comparator is connected in a manner such that a bit signal at level "1" is output in the case where the voltage $V_0$ is higher than each threshold level as shown in FIGS. 2 and 3, and that a signal at level "0" is output when it is equal to or lower than the threshold level.

The intermediate gradient image signals of four values obtained in this way, which can be considered four a signal of multi-value comprising bits, are input to the encoder 11 and are encoded by a two-dimensional encoding method, e.g., by the MR method.

The MR method will then be briefly explained below. In the MH encoding method, the image data itself of one line is completed as a combination of run-lengths of white and black. On the contrary, in the MR method, the image data of each scanning line is encoded with respect to the image data of the adjacent scanning lines to raise the compressibility and suppress the oscillation of the image due to telegraph-transmission error. In this MR method, a higher compressibility can be obtained as the cross-correlation between the data of the reference line and the data of the scanning line is higher. The number of reference lines is called a K parameter and the value of K-1 represents the number of lines referred. In the MR method, the same run-length code as that in the MH method is ordinarily used and the first scanning line of the original cannot have the reference line; therefore, a similar encoding result to that of the MH code is obtained.

In this embodiment, the binary processing result is encoded by the MR method; however, in this case, an output signal of the comparator 10d, i.e., the signal which was binary processed by the threshold level TH1 is encoded by the MH encoding method and output signals of the other comparators, i.e., the signals which were binary processed by the threshold levels TH2 to TH4 are encoded by the MR method. The respective processing results are sequentially transmitted to the line 13 through the modem 12. The signal flow on the line 13 in this case is shown in FIG. 4.

Figure 4:
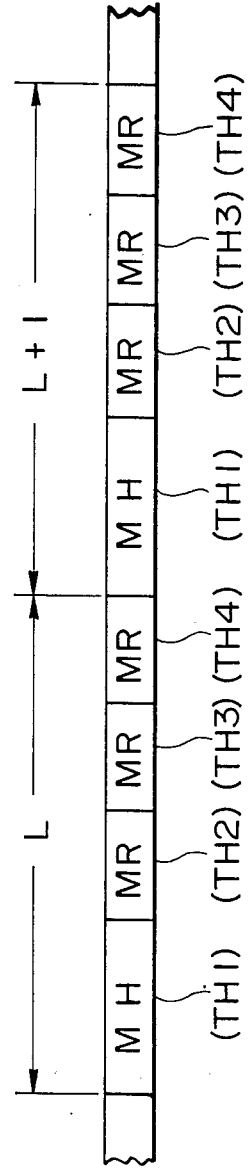
FIG. 4 is an explanatory diagram showing a method of encoding a signal on a telegraph-transmission line according to the present invention.

FIG. 4 shows the signal on the transmission line (circuit) with the time elapse, in which a reference character L indicates the image data of the present scanning line and L+1 represents the image data of the next scanning line. As described above, in this invention, the image data of one physical line is telegraph-transmitted as the image data of four so-called logical four lines, and the data by the first threshold level in such a case is telegraph-transmitted by the MH encoding method like the data of the first line of the original in the ordinary MR encoding transmission.

The use of such a telegraph-transmission method enables the high speed telegraph-transmission of the picture image at intermediate gradient to be realized. This is because a high compressibility can be obtained by the MR method since there is a high statistical cross-correlation between a plurality of binary data derived in this way and the binary data obtained by the adjacent threshold levels.

On the other hand, in the apparatus on the image recording side, the image data input through the line 13 is demodulated by the modem 12 and is decoded by the decoder 14. At this time, the MH code which was binary processed by the threshold level TH1 is first subjected to the decoding processing, and thereafter, the subsequent MR codes are subjected to the decoding processing and are once stored in the memory 15. After that, the image is recorded by the recorder 16 in accordance with these processing results without passing through the memory 15. The timings in this case are shown in FIG. 5A.

Figure 5A:
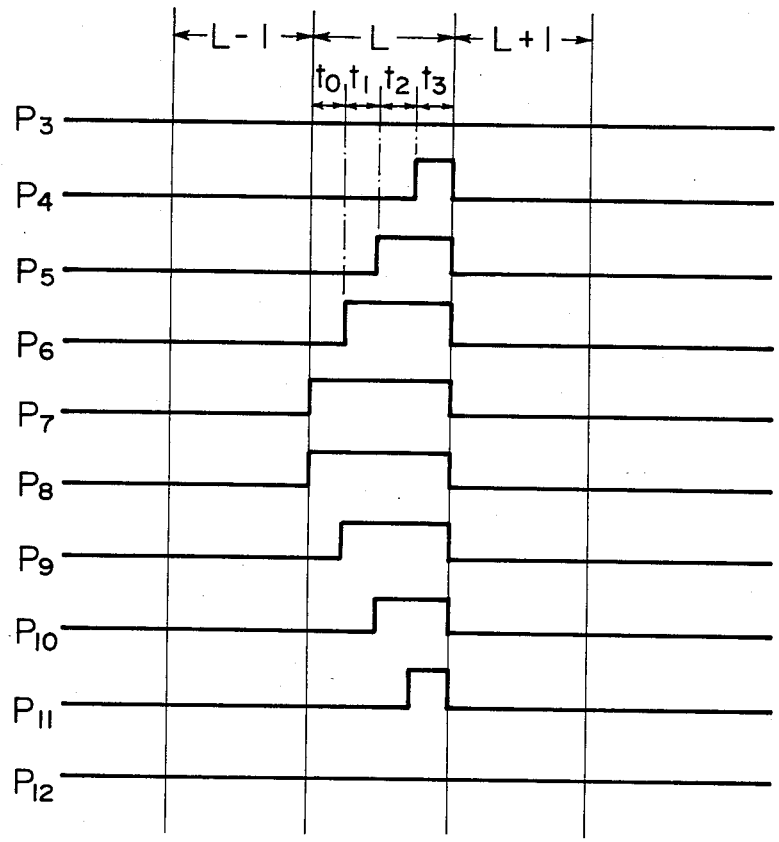
FIG. 5A is a diagram to explain image recording according to the present invention.

In FIG. 5A, the character L indicates the line which is being processed as mentioned before; and L+1 and L−1 represent the lines after and before the line L, respectively. $P_3$ to $P_{12}$ correspond to the dot recording positions of the recorder 16 corresponding to the scanning pixel positions $P_3$–$P_{12}$ in FIG. 2 (the pixel positions $P_0$–$P_2$ and $P_{13}$–$P_{15}$ are omitted for simplicity). As mentioned above, assuming that the recorder 16 is a thermal printer, these positions are considered to be the respective exothermic elements of the thermal head.

As shown in FIG. 5A the MH code which was binary processed by the threshold level TH1 is decoded first at a time $t_0$ and is recorded. The binary processing result by the threshold level TH1 is such that only the pixels at the positions $P_7$ and $P_8$ are at level "0" as shown in FIG. 3; therefore, the exothermic elements corresponding to the positions $P_7$ and $P_8$ are energized.

At a next time $t_1$, the binary processing result which was encoded by the threshold level TH2 by the MR encoding method is decoded and is recorded. Therefore, the exothermic elements corresponding to the positions $P_6$ to $P_9$ are energized (refer to FIG. 3).

Subsequently, at a time $t_2$, the exothermic elements corresponding to the positions $P_5$ to $P_{10}$ are energized similarly, and at a time $t_3$, the exothermic elements corresponding to the positions $P_4$ to $P_{11}$ are energized.

Figure 5B:
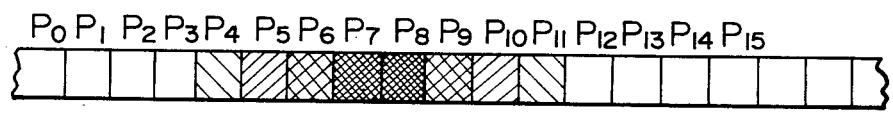
FIG. 5B is an explanatory diagram showing a recording intensity corresponding to FIG. 5A.
Figure 6:
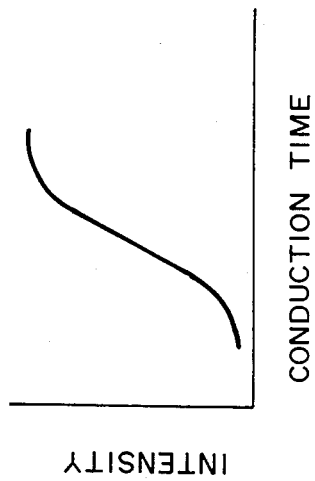
FIG. 6 is a graph to explain the intensity characteristic in a thermal recorder.

As described above, the total energizing time of each exothermic element can be varied in dependence upon the intensity level of the image. Thermal printers ordinarily have the recording intensity characteristic as shown in FIG. 6 with respect to the energizing time. Thus, the recording intensity varies depending upon the intermediate gradient of four values as shown in FIG. 5B.

In the similar manner to the above, the subsequent lines are recorded. However, since the head image data of the next line L+1 is telegraph-transmitted as the MH code as indicated in FIG. 4, even if a code error occurs during the transmission, its image data can be determined as the first signal of the next line by an EOL (end of line) signal which is certainly used in the MH encoding method. Thus, the recording error due to the code error will not occur in the next line.

Figure 7:
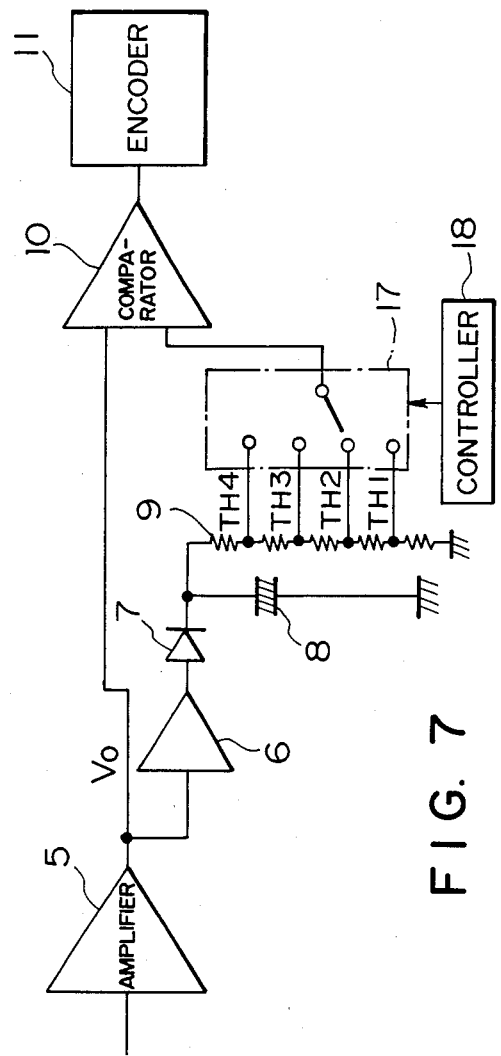
FIG. 7 is a block diagram showing another embodiment of the invention.

FIG. 7 shows a constitution of another embodiment of the present invention, in which the similar parts and components to those in the foregoing embodiment are designated by the same reference numerals, and it is assumed that the sections not shown in FIG. 7 are constituted in the similar manner as those in FIG. 1.

In the first embodiment, the individual comparators 10 are respectively provided with regard to each threshold levels TH1 to TH4 and the image signal is binary processed simultaneously by the four threshold levels when one line is scanned. However, in the embodiment of FIG. 7, only one comparator 10 is provided. In this embodiment, a switch 17 is switched by a controller 18 for every one line of the original and that line is scanned four times by the threshold levels TH1 to TH4, and the binary processing is performed by the comparator 10. The controller 18 is constituted by a microcomputer and is a control unit for controlling the whole apparatus. It is possible to use a publicly known microcomputer by modifying its software.

In this embodiment, only one comparator 10 is enough and is fundamentally similarly constituted as the conventional apparatus except that the levels are switched by the switch 17. Namely, by constituting the conventional apparatus such that the threshold levels are changed over and that only the number of scanning times is changed, the conventional apparatus can be used as it is without changing the comparator and encoder.

Furthermore, in the above embodiments, the MR encoding method has been shown as an example of the two-dimensional encoding method. However, a similar effect can be derived by using any other proper methods. Also, a value of K parameter in the case of using the MR method may be set to a desired numerical value in accordance with necessity.

As is obvious from the above description, according to the present invention, an output of one scanning line of photoelectric converting means is binary processed by a plurality of threshold levels and a plurality of binary outputs derived by this binary processing are two-dimensionally encoded and are telegraph-transmitted; therefore, there are the following excellent effects.

First of all, the intermediate gradient can be telegraph-transmitted using the similar comparator, encoder and decoder for the binary transmission as in the conventional ones as they are, so that the present invention is economical. As mentioned above, in this invention, the image data of one physical scanning line may be processed as the data of virtual four lines when it is encoded and telegraph-transmitted. Therefore, it is unnecessary to remarkably modify the constitution of the apparatus as compared with the conventional apparatus. In addition, if the apparatus is commonly used together with the conventional method, compatibility will be easily and certainly obtained.

The signals derived by the adjacent threshold levels among the signals which were binary processed by the respective threshold levels of the intermediate gradient have an extremely high statistical cross-correlation. By adopting the MR encoding method, high compressibility is obtained. Thus, the telegraph-transmission efficiency of the image at intermediate gradient can be raised.

The number of levels of intermediate gradient can be set to any number. Although the intermediate gradient levels of four values have been shown as an example in the embodiments, by merely increasing the threshold levels, the picture image at a variety of intermediate gradients of eight values, sixteen values or the like can be telegraph-transmitted and recorded. Therefore, a high degree of freedom in designing the apparatus is derived.

What is claimed is:

1. An image data processor comprising:
    photoelectric converting means for converting original image data to an electrical image signal;
    comparing means for comparing the electrical image signal of one scan line with a plurality of different threshold levels to obtain a plurality of binary time series signals corresponding respectively to each of the threshold levels; and
    encoding means for one-dimensionally encoding one of the plurality of the binary time series signals and two-dimensionally encoding the rest of the plurality of the binary time series signals, wherein said encoding means two-dimensionally encodes correlation between said one binary time series signal and the rest of the plurality of the binary time series signals.

2. An image data processor according to claim 1, wherein said comparing means comprises a plurality of comparators each of which compares a different one of the plurality of threshold levels with the electrical image signal.

3. An image data processor according to claim 1, wherein the one-dimensional encoding is Modified Huffman encoding and the two-dimensional encoding is Modified Read encoding.

4. An image data processor according to claim 3, wherein the parameter K of the Modified Read encoding is equal to the number of the threshold levels.

5. An image data processor according to claim 1, wherein the threshold levels are determined in response to the electrical image signal.

6. An image data processor according to claim 5, wherein the threshold levels are determined in response to the peak level of the electrical image signal.

7. An image data processor according to claim 1, wherein said comparing means comprises means for selecting one of the plurality of threshold levels and a comparator for comparing the selected threshold level with the electrical image signal.

8. An image data processor according to claim 1, further comprising means for sequentially transmitting the signals encoded by said encoding means.

9. An image data processor comprising:
    photoelectric means for converting original image data to an electrical image signal;
    converting means for converting the electrical image signal of one scan line to a signal of multi-values, said signal of multi-values comprising a plurality of bits; and
    means for encoding a plurality of binary time series signals, said encoding means one-dimensionally encoding one of the binary time series signals each for one of levels of the multi-value signal and two-dimensionally encoding the rest of the binary time series signals, wherein said encoding means two-dimensionally encodes correlation between said one binary time series signal and the rest of the binary time series signals.

10. An image data processor according to claim 9, wherein said converting means comprises a comparator for comparing the electrical image signal with a plurality of different threshold levels.

11. An image data processor according to claim 9, wherein the one-dimensional encoding is Modified Huffman encoding and the two-dimensional encoding is Modified Read encoding.

12. An image data processor according to claim 11, wherein the parameter K of the Modified Read encoding is equal to the number of the multi-value signal bits.

13. An image data processor according to claim 9, further comprising means for sequentially transmitting the signals encoded by said encoding means.

* * * * *